United States Patent [19]

Aronstam

[11] Patent Number: 5,044,461
[45] Date of Patent: Sep. 3, 1991

[54] DECOUPLED BOREHOLE SENSOR

[75] Inventor: Peter S. Aronstam, Katy, Tex.

[73] Assignee: Western Atlas International, Inc., Houston, Tex.

[21] Appl. No.: 639,549

[22] Filed: Jan. 10, 1991

[51] Int. Cl.⁵ .............................. G01V 1/40; E21B 4/18
[52] U.S. Cl. ..................................... 181/102; 181/401; 367/911; 175/50
[58] Field of Search ............... 181/102, 108, 105, 401; 367/25, 35, 188, 911; 33/1 HH, 1 P, 302; 166/256; 175/50, 325, 326; 381/205; 324/367

[56] References Cited

U.S. PATENT DOCUMENTS

| 2,191,121 | 2/1940 | Slichter | 367/911 |
|---|---|---|---|
| 2,943,694 | 7/1960 | Goodman | 181/102 |
| 3,363,719 | 1/1968 | Venghiattis | 181/401 |
| 3,564,914 | 2/1971 | Desai et al. | 181/105 |
| 4,578,785 | 3/1986 | Gelfand | 367/35 |
| 4,670,862 | 6/1987 | Staron et al. | 367/25 |
| 4,686,653 | 7/1987 | Staron et al. | 181/102 |
| 4,811,814 | 3/1989 | Staron et al. | 181/108 |
| 4,852,069 | 7/1989 | Clerke et al. | 181/105 |
| 4,874,060 | 10/1989 | Guerendel et al. | 181/102 |
| 4,987,969 | 1/1991 | Boyle et al. | 367/911 |

OTHER PUBLICATIONS

Combinable Seismic Images, Sales Brochure, Schlumberger Well Sevices, 4/90.

Primary Examiner—Nelson Moskowitz
Attorney, Agent, or Firm—William A. Knox

[57] ABSTRACT

A sensor module having tri-axial spatial sensitivity is mounted in a closed compartment of an acoustic logging tool. The sensor module is resiliently mounted with three degrees of freedom with respect to the body of the tool. The compartment includes a volume of damping fluid to suppress parasitic vibrations transmitted to the sensor module from the tool body. In the inactive condition, a contact shoe, associated with the sensor module, projects through a window in the closed compartment. In the operating configuration, the sensor module and its contact shoe are caused to retract into the compartment against a compressive force when the logging tool is pressed against the wall of a borehole.

6 Claims, 3 Drawing Sheets

DECOUPLED BOREHOLE SENSOR

BACKGROUND OF THE INVENTION

1. Field of the Invention

This invention is concerned with down-hole acoustic logging tools for use in vertical seismic profiling.

2. Discussion of the Prior Art

In vertical seismic profiling, a seismic sensor is lowered into a bore hole to a plurality of predetermined depths. At each depth station, a surface source generates a seismic wavefield. The seismic waves detected by the sensor at the respective depths are transmitted by suitable means to data storage and processing means of any well known type.

Typically, the sensor is mounted on or associated with some sort of sonde which may include other tools such as an inclinometer to measure the slant of the bore hole. The sonde may be one or two meters long and six to ten centimeters in diameter and may weigh on the order of 100 kilograms. The sonde is maneuvered up and down the borehole by a cable connected to a winch located at the surface. At each depth station, the sonde is locked firmly in the hole by a mechanical caliper device of known type that is usually electrically operated through control lines integral with the hoisting cable.

In the hole, the sonde itself is perturbed by not only seismic waves propagating through the formation to which it may be locked at some depth station, but also by random noise such as rattling of the supporting cable and tube waves that travel through the borehole fluid. The various spurious wave fields set up resonances in the sonde in accordance with its parameters of mass, length and moduli of elasticity. Such resonances, if transmitted to the associated seismic sensor, obscure or badly distort the desired seismic signals. Therefore, the sensor must be acoustically isolated from the sonde itself.

In U.S. Pat. No. 4,578,785, assigned to the assignee of this invention, the sensor is secured to one leaf of a spider. While the sonde is being lowered into the hole, the spider and the sensor are nested inside the bottom of the sonde. At a desired depth station the sonde is locked in place; the spider is ejected from the bottom open end of the sonde to expand and lodge itself against the borehole wall, completely isolated acoustically from the sonde. A slack umbilical line is provided to transmit seismic signals from the sensor to the sonde and thence to a processor at the surface via a wire line that is integrated with the hoisting cable secured to the sonde. The disadvantage of that device is the complexity of the ejection/recovery mechanism installed in the sonde plus the possibility that the spider might break loose from the sonde if a tight spot is encountered in the hole.

U.S. Pat. No. 4,874,060 discloses a sensor probe that is mounted in a recess in a sonde that is, as usual, secured to the end of hoisting cable. At a desired depth level, an anchoring arm locks the sonde against one sidewall of the borehole. The sensor is mounted on an hydraulic piston that pushes the sensor laterally out of the side of the sonde to contact the same sidewall of the hole against which the sonde is locked. The sensor module is not acoustically isolated from the parasitic vibrations that may be set up in the sonde. The hydraulic piston and circuitry is complicated. In the case of a triaxial system, three separate piston units are needed. By reason of its configuration, the moving parts of the assembly, as disclosed in the patent, are open to the drilling fluid in the well bore; mud and solid particles suspended therein become lodged behind the mechanism to jam it.

Another probe-type downhole sensor is taught by U.S. Pat. No. 4,811,814. Here, the sonde is locked against one sidewall of the well bore at a desired depth level. A sensor, spring mounted on a probe, is poked out laterally against the opposite side wall. Although the sensor is partially isolated from the sonde by springs, the probe extension mechanism (of undisclosed nature) is necessarily complicated and subject to jamming by particulate matter in the drilling fluid. Furthermore, if triaxial response is required, three separate mechanisms apparently are necessary according to the disclosure. Although the sensor is spring mounted and hence, is partially decoupled from the sonde, no damping is provided. Accordingly, harmonics and subharmonics of sonde resonances may corrupt the sensor signal.

A sales brochure promulgated by Schlumberger advertises a Combinable Seismic Imager TM. This brochure illustrates a sonde that includes a spring-mounted sensor probe that can be pressed against the sidewall of a borehole by an undisclosed mechanism. As with any probe-mounted device that must be pushed out of a recess in a sonde, the probe-extension mechanism is necessarily complicated and is subject to contamination by drill-fluid-borne debris.

It is an object of this invention to provide a downhole sonde-mounted seismic sensor that may be firmly pressed against the sidewall of a bore hole without use of complicated probe-extension mechanisms, that will have three degrees of acoustic and mechanical freedom with respect to the sonde, that will be acoustically decoupled from the sonde and properly damped, that will be protected from contamination by drill-fluid-borne debris and that will include triaxial capability within a single compact module.

SUMMARY OF THE INVENTION

In accordance with a preferred aspect of this invention, I provide an acoustic logging tool. The tool consists of a sonde having a closed compartment formed therein. A window is formed in the wall of the sonde opposite the closed compartment. A sensor module, having tri-axial sensitivity, is resiliently mounted within the closed compartment, the mounting arrangement of the module offers three degrees of freedom with respect to the sonde. A damping fluid fills the closed compartment. The purpose of the fluid is to damp the parasitic vibrations generated in the sonde from being transmitted to the sensor module through the resilient support means. The sensor module includes a contact shoe that is forced to project through the window by the compressive force of the resilient mounting means. In operation, the sonde is displaced against one wall of a borehole, forcefully pressing the exterior contact shoe against the borehole wall. The sensor module is thereby caused to retract into the closed compartment against the compressive force of the resilient mounting means.

In accordance with another aspect of this invention, means are provided for equalizing the pressure in the closed compartment with respect to the ambient hydrostatic pressure of the borehole fluid.

BRIEF DESCRIPTION OF THE DRAWINGS

These and other benefits of my invention will be better appreciated from the appended detailed description of the preferred embodiment and the drawings wherein.

DESCRIPTION OF THE PREFERRED EMBODIMENT

Figure 1:
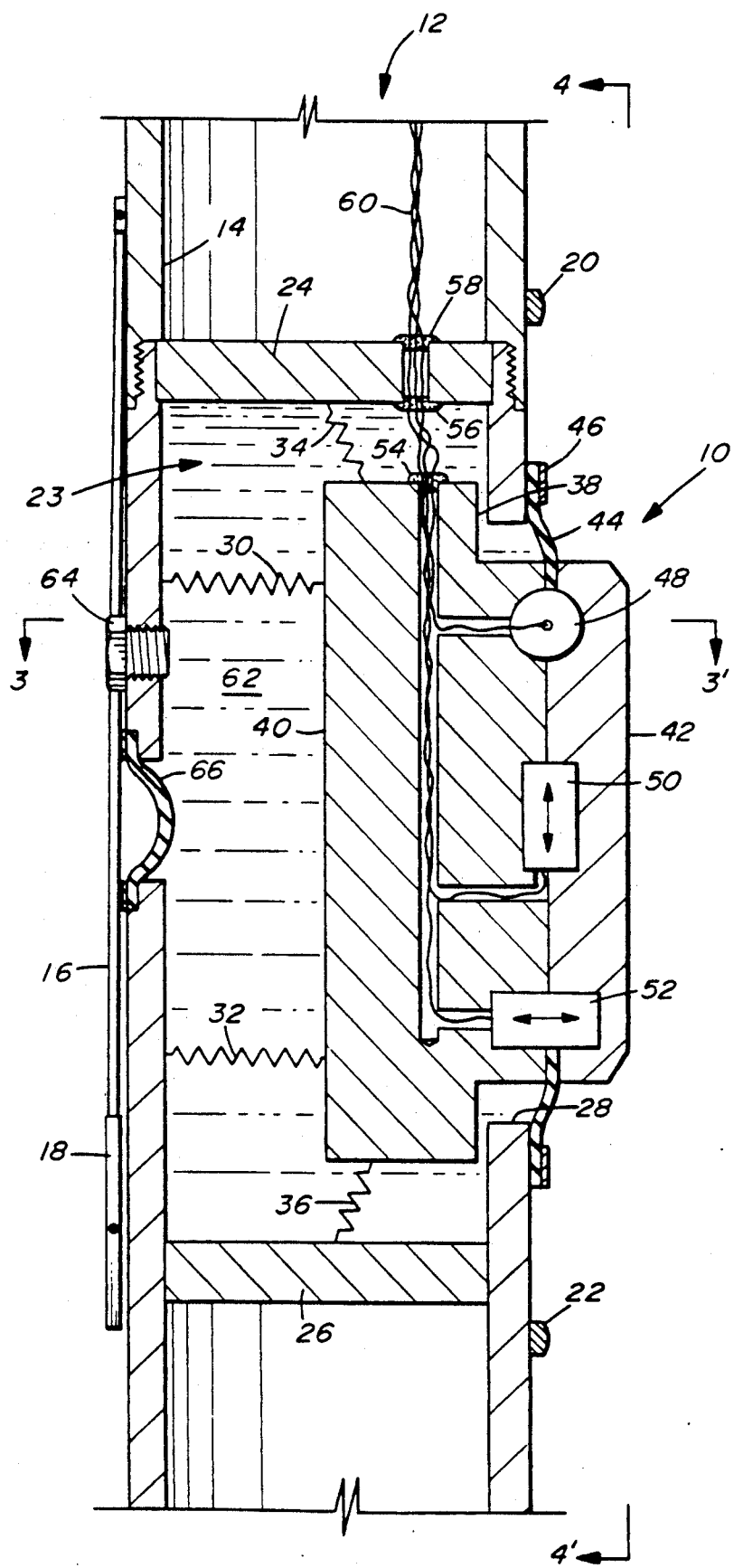
FIG. 1 is a cross-sectional view of the major components of the sensor and its housing with the sensor in its extended or rest position.

In FIG. 1, there are shown the essentials of the acoustic logging tool of this invention. A sensor module 10 is mounted in a compartment formed in a sonde 12. Sonde 12 is conventional; it may be a hollow tube 14, 1-2 meters long made of stainless steel or other suitable material, with an outer diameter, perhaps, of 6-10 centimeters. A bail at the top (not shown) is provided for attachment to a hoisting cable in a known manner. In addition to the sensor module 10, the sonde may include other types of sensing devices also not shown. A caliper arm 16 and clamping foot 18, shown here folded against the left hand outer wall of the sonde, is hingeably mounted on the sonde 12 to lock it against the wall of a borehole as will be discussed in connection with FIG. 2. Bumpers or standoffs 20 and 22 are mounted on the external wall of the sonde, on the side opposite to the caliper arm.

A closed compartment 23 is formed in the sonde by bulkheads 24 and 26 which are sealed in place by any convenient means and which may be removable to allow access into the compartment. A window 28 is cut into the wall of the compartment, midway between bulkheads 24 and 26. Sensor module 10, which may be rectangular, circular or ovoid in outline when seen from the front, projects through window 28, urged in place by the compression springs 30 and 32 along with top and bottom centering springs 34 and 36 to provide the sensor module 10 with three degrees of freedom relative to the sonde. A retaining shoulder portion 38 holds the module inside closed compartment 23. Sensor module 10 may conveniently consist of two portions, 40 and 42 which may be held together by bolts (not shown in FIG. 1, see FIG. 4). Portion 42 conveniently serves as an exterior contact shoe for transferring seismic signals to discrete sensor elements as will be discussed infra. A flexible seal 44 is clamped to the sensor module around the perimeter of the module, firmly gripped by the two halves 40 and 42 when they are bolted together. The outer perimeter of seal 44 is secured to the outer wall of the sonde around window 28 by a retaining ring 46 which may be held in place on the external wall of sonde 12 by screws (not shown in FIG. 1). Seal 44 may be of any suitable plastic that will survive the high temperatures of a deep borehole. It must be sufficiently pliable so that it will not transmit spurious vibrations from the sonde body to module 10. Sensor module 10 may be of stainless steel, aluminum, titanium or other material that is not subject to corrosion by the drilling fluids.

Three separate seismic sensor elements 48, 50, 52 are mounted within sensor module 10. The sensor elements may be gimbal-mounted geophones or piezoelectric accelerometers at the option of the user in view of the field conditions and the types of measurements to be made. The sensor elements must be mounted such that their sensitive axes, as shown by the double-headed arrows, are mutually orthogonal to provide a sensor module having tri-axial spatial sensitivity. Electrical signal leads from the sensor elements are fished through passageways as shown, through a hermetic seal 54 at the top of sensor module 10 and hermetic seals 56 and 58 in bulkhead 24, to form a conductor bundle 60. Conductor bundle 60 extends on up the sonde to join the hoisting cable in a known manner.

Closed compartment 23 is filled with a fluid 62 such as an inert silicone oil of any convenient type that will retain its desired viscosity under high temperature. The spring system, 30-36 provides three degrees of freedom and acoustic isolation from the sonde. The fluid 62 in compartment 23 provides the damping that is essential to prevent undesired transmission of harmonic and subharmonic resonances from the sonde to the sensor module, through the spring system. The viscosity of the fluid is chosen after consideration of the area of that portion of module 10 that is exposed to the fluid, the spring constants of the resilient supports and the temperatures to be expected down the hole. Flexible seal 44 seals the fluid within compartment 23 yet permits sensor module 10 to freely project or retract into sonde 12. A fill plug 64 is furnished for filling the compartment with fluid. A flexible membrane or diaphragm 66, mounted on the side of compartment 23 and exposed to the ambient hydrostatic pressure in the well bore, provides pressure equalization with respect to the fluid pressures encountered in the borehole.

The normal position for the sensor module 10, when inactive, is in the extended position as shown in FIG. 1, which is an arrangement that is just the opposite from that of the references. The corners of sensor module 10 may be rounded so that it will not hang up on obstructions when it is lowered into the well bore. Because the module is resiliently mounted, the entire assembly it will easily slide through tight spots.

Figure 2:
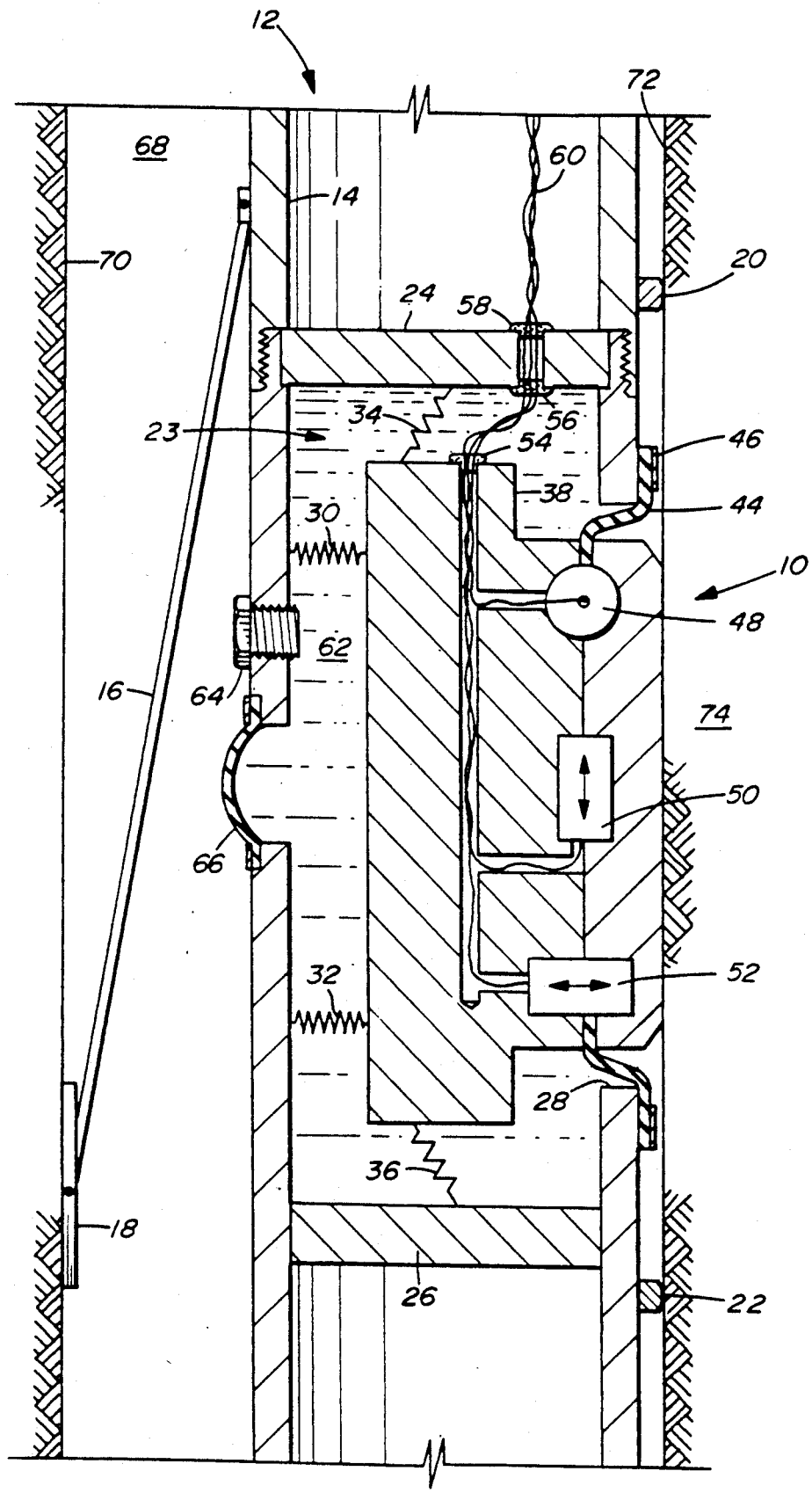
FIG. 2 is a cross section of the sensor and its housing with the sensor in the retracted or operating position.

FIG. 2 shows the sonde and the sensor module after having been lowered into a borehole 68, in operating configuration. At a selected depth station, a control signal from the surface causes caliper arm 16 to extend and press locking foot 18 against one side 70 of the borehole 68. The mechanism and control for that function are well known and conventional so there is no need to go into detail in the matter. With the caliper arm extended, sonde 12 is forced against the opposite side 72 of borehole 68. That action causes sensor module 10 to retract inwardly as shown, pressing external contact shoe 42 forcefully against formation 74 (or the casing if the hole is cased) that makes up the borehole wall. Contact shoe 42, lodged firmly against formation 74, feels acoustic signals propagating through formation 74 and transmits the signals to the respective sensor elements in sensor module 10. The preferred application force is a multiple of the mass of the sensor module, preferably about ten times the mass thereof, and is provided by compression springs 30 and 32 as well as by top and bottom centering springs 34 and 36. For a 0.5-kilogram module, the preferred compressive force is about 5.0 kilograms. It is to be observed that the volume of fluid 62 that is displaced, when module 10 is caused to retract inwardly, causes pressure equalization diaphragm 66 to bulge outwardly. In effect, pressure equalization diaphragm acts as a reservoir to receive the displaced damping fluid. Alternatively, a spring-loaded piston arrangement might serve the same purpose. Seal 44 that surrounds sensor module 10 prevents debris carried by the drilling fluids from interfering with the three degrees of freedom of the module with respect to the sonde. As before stated, fluid 62 inside compartment 23 damps spurious resonances, that might be generated in the sonde, from being communicated to the sensor module through the spring system.

Figure 3:
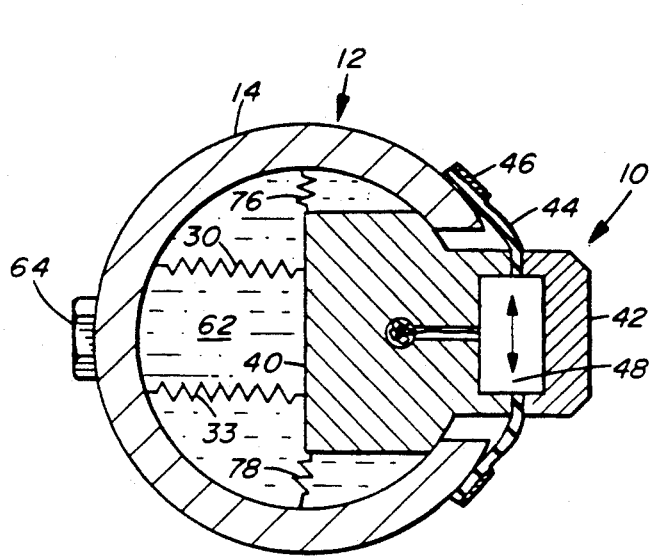
FIG. 3 is a cross section across line 3—3' of FIG. 1.

FIG. 3 is a plan view of the tool assembly along 3—3' of FIG. 1. In addition to the springs shown in the first two Figures, lateral centering springs 76 and 78 are furnished. It is preferable that a pair of compression springs such as 30 and 33 be provided on the back of sensor module 10, one pair near the top and one pair and near the bottom. The directional sensitivity of sensor element 48 is shown more clearly in this Figure. Otherwise the parts are as shown in FIGS. 1 and 2.

Figure 4:
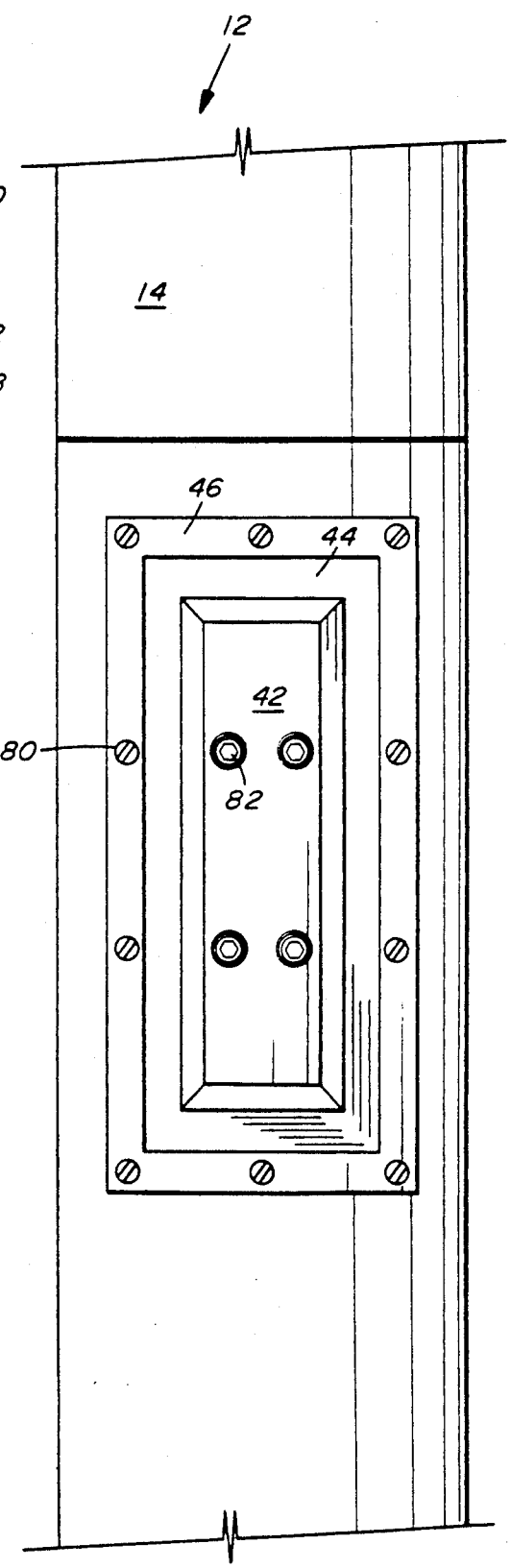
FIG. 4 is an exterior frontal view of the tool as would be seen from 4—4' of FIG. 1.

FIG. 4 is a frontal external view of the tool assembly 12 as it would appear from 4—4', FIG. 1. Seal retaining ring 46 may be held in place on the outer wall 14 of the sonde by screws such as 80. If desired, the retaining ring 46 and the outer edge of the flexible seal 44 may be inset into the wall of the sonde for a smoother exposure. The two portions 40 and 42 (FIGS. 1 and 2) of sensor module 10 are held together by countersunk bolts such as 82. The configuration of the sensor assembly is shown as rectangular but it may be square, round or ovoid as earlier mentioned. It is clear from the drawings that the sensor assembly presents a relatively clean outline to the environment within the well bore. In particular, there are no cavities or openings wherein debris can collect to jam free movement of the sensor module 10 relative to sonde 12.

The configuration of the assembly of this invention as shown in the drawings is exemplary. Many variations in the design will be contemplated by those skilled in the art but which will fall within the spirit and scope of this disclosure which is limited only by the appended claims. For example, only one sensor module is shown in the drawings. Several independent sensor modules may be included in a single acoustic logging tool assembly. The distribution of the individual sensor elements within sensor module 10 may be altered from that shown. The construction of tool 12 will be such as to allow the convenient emplacement of module 10 in closed compartment 23 and to permit the sealing of bulkheads 24 and 26 inside tube 14, the details of which construction have not been shown since they are routine engineering design matters.

I CLAIM AS MY INVENTION:

1. A downhole acoustic logging tool, comprising:
   a sonde;
   a closed and sealed compartment formed in said sonde;
   a window in a side of said closed compartment;
   a sensor module, characterized by tri-axial spatial sensitivity and including an exterior contact shoe;
   passive support means for resiliently mounting said sensor module in said closed compartment with three degrees of freedom with respect to said sonde, said resilient mounting means including means for forcibly urging said exterior contact shoe to project outwardly through said window;
   means, sealed within said closed compartment, for damping parasitic vibrations communicated to said sensor module;
   means for displacing said sonde so that said exterior contact shoe is forcibly pressed against a wall of a borehole thereby to cause said shoe to retract inwardly into said compartment through said window against the force of said means for urging;
   means, mounted in a wall of said closed compartment, for equalizing the pressure between the interior of said closed compartment and the ambient fluid pressure in said borehole.

2. The acoustic logging tool as defined by claim 1, wherein:
   said means for damping is an inert fluid having a predetermined viscosity.

3. The acoustic logging tool as defined by claim 1, wherein:
   the force applied by said means for urging is a preselected multiple of the mass of said sensor module.

4. The acoustic logging tool as defined by claim 1, comprising:
   at least three discrete acoustic sensor elements enclosed within said sensor module, said sensor elements being mounted with their sensitive axes in mutually orthogonal orientation.

5. The acoustic logging tool as defined by claim 2, comprising:
   means for receiving the volume of damping fluid that is displaced when said sensor module is caused to retract inwardly.

6. The acoustic logging tool as defined by claim 1, comprising:
   flexible means secured between said sensor module and the borders of the window in the side of said closed compartment for sealing said means for damping within said closed compartment.

* * * * *